US010352250B2

(12) United States Patent
Guillemont et al.

(10) Patent No.: US 10,352,250 B2
(45) Date of Patent: Jul. 16, 2019

(54) EQUIPMENT SUPPORT OF A TURBO MACHINE COMPRISING A REDUCER WITH MAGNETIC GEARS

(71) Applicant: SAFRAN TRANSMISSION SYSTEMS, Colombes (FR)

(72) Inventors: Maxence Guillemont, Colombes (FR); Stephane Prunera-Usach, Jurancon (FR); Julien Viel, Agenteuil (FR); Antoine Barbe, Force (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 262 days.

(21) Appl. No.: 15/518,281

(22) PCT Filed: Oct. 15, 2015

(86) PCT No.: PCT/FR2015/052772
§ 371 (c)(1),
(2) Date: Apr. 11, 2017

(87) PCT Pub. No.: WO2016/059346
PCT Pub. Date: Apr. 21, 2016

(65) Prior Publication Data
US 2017/0306854 A1     Oct. 26, 2017

(30) Foreign Application Priority Data

Oct. 17, 2014   (FR) ...................................... 14 60046

(51) Int. Cl.
*F01D 15/12*     (2006.01)
*F02C 7/32*     (2006.01)
(Continued)

(52) U.S. Cl.
CPC ................. *F02C 7/32* (2013.01); *H02K 5/20* (2013.01); *H02K 7/11* (2013.01); *H02K 7/116* (2013.01);
(Continued)

(58) Field of Classification Search
CPC .. F02C 7/32; H02K 7/11; H02K 7/116; H02K 5/20; H02K 5/18; H02K 49/00;
(Continued)

(56) References Cited

U.S. PATENT DOCUMENTS 4,546,865 A    10/1985   Hodgman et al.
2007/0277532 A1   12/2007   Talan
(Continued)

FOREIGN PATENT DOCUMENTS

DE    10 2009 031 727 A1    2/2010
DE    10 2012 008 209 A1   10/2013
(Continued)

OTHER PUBLICATIONS

International Search Report dated Feb. 5, 2016 in PCT/FR2015/052772 filed Oct. 15, 2015.
(Continued)

*Primary Examiner* — Hai H Huynh
(74) *Attorney, Agent, or Firm* — Oblon, McClelland, Maier & Neustadt, L.L.P.

(57) ABSTRACT

An equipment support including at least one attachment including an output shaft, an input gear wheel, the input gear wheel being both rotated by the motor shaft at a main speed and also connected to the output shaft of the attachment in order to rotate it at a determined output speed, an input shaft, rotated by the input gear wheel at a determined input speed, and a reducer with magnetic gears, arranged between the input shaft and the output shaft, such that the input speed is different from the output speed.

9 Claims, 5 Drawing Sheets

(52) U.S. Cl.
CPC ....... *H02K 49/00* (2013.01); *F05D 2250/313* (2013.01); *F05D 2250/314* (2013.01); *F05D 2260/404* (2013.01); *H02K 5/18* (2013.01); *Y02T 50/671* (2013.01)

(58) Field of Classification Search
CPC ......... F05D 2260/404; F05D 2250/313; F05D 2250/314; Y02T 50/671
USPC ...................................................... 415/124.1
See application file for complete search history.

(56) References Cited

U.S. PATENT DOCUMENTS

| | | |
|---|---|---|
| 2008/0136189 A1 | 6/2008 | Qu et al. |
| 2011/0284328 A1 | 11/2011 | Brandt et al. |
| 2015/0130302 A1 | 5/2015 | Leberle et al. |

FOREIGN PATENT DOCUMENTS

| | | |
|---|---|---|
| EP | 1 863 166 A1 | 12/2007 |
| EP | 1 931 018 A2 | 6/2008 |
| EP | 2 107 228 A1 | 10/2009 |
| EP | 1 931 018 A3 | 1/2014 |
| FR | 1 355 241 | 3/1964 |
| FR | 2 938 015 A1 | 5/2010 |
| FR | 3 006 734 A1 | 12/2014 |
| WO | 2010/086422 A1 | 8/2010 |

OTHER PUBLICATIONS

French Preliminary Search Report dated Jun. 11, 2015 in Patent Application No. 1460046 (with English language Translation of Categories of Cited Documents).

International Search Report dated Feb. 5, 2016 in PCT/FR2015/052772 (with English language Translation of Categories of Cited Documents).

EQUIPMENT SUPPORT OF A TURBO MACHINE COMPRISING A REDUCER WITH MAGNETIC GEARS

FIELD OF THE INVENTION

The present invention relates to the field of turbo machines. It relates in particular to the mounting of auxiliary equipment and the mechanical transmission between an engine shaft of a turbojet engine or of a turboprop engine and this equipment using an accessory gearbox or AGB, or between the engine and the propeller of a turboprop using a propeller gearbox of the PGB type.

TECHNOLOGICAL BACKGROUND

The accessory gearbox, well known to a person skilled in the art under its abbreviation AGB, supports different auxiliary equipment mounted on the engine and necessary to its operation or to that of the aircraft. These various accessories can in particular comprise a generator, a starter, an alternator, hydraulic pumps for fuel or oil, and are driven mechanically by the engine shaft through transmission shaft. The necessary power for driving accessories is generally tapped mechanically from the compressor of the turbo machine.

Customarily, the AGB comprises gearing with parallel shafts so as to mechanically drive the accessories. The separation of the accessories is therefore determined by the distance between centers of the gearing and not by their respective sizes. To increase this separation it is therefore necessary to add one or more intermediate gears, which has the disadvantage of increasing both the size of the AGB and its mass. Moreover, the shafts of all the gearing of the AGB being parallel, the accessories necessarily have the same orientation with respect to the AGB and the engine.

Moreover, in the case of a turbofan engine, the gas generator is connected to a fan which is housed in a fan casing. The nacelle then has a generally circular section. The space available for accommodating the AGB is consequently defined by an annular portion housed in the nacelle, around the turbo machine, and consequently has a generally curved shape (see FIG. 1).

To improve engine performance, one solution consists of reducing the size of the nacelle at the fan so as to increase the size of the fan without thereby increasing the outer diameter of the turbo machine. The space available in the nacelle below the fan is therefore strongly reduced; it is therefore necessary either to reduce the size of the AGB so as to be able to be able to integrate it under the fan in the nacelle anyway, or to replace the AGB downstream of the fan in the central compartment of the turbo machine (that is in the "core" area), wherein the available space is even more limited.

Conventional turbofan AGBs are therefore not suitable from a structural, dimensional and function point of view to the new fan configurations and to the core area of the turbo machine.

An AGB has therefore been proposed in document FR 1355241 in the name of the applicant comprising:
a primary angle drive formed from an input gear wheeling member driven by the engine shaft of the turbofan and from a primary gearing member,
at least one mechanical drive assembly of the accessory transmission shaft, which is driven by the primary drive means through a secondary angle drive comprising two meshing non-parallel gearing members.

Such an AGB with gearing with non-parallel axes has the advantage of being easily modulated and to also allow flexibility in installing different accessories by not having to consider their size, without however modifying their drive speed.

However, updating of specifications on an AGB can lead to changes in accessories or in rotation speeds on certain existing lines, which involves redefining the kinematic chain of the AGB and the risk increases arising therefrom.

SUMMARY OF THE INVENTION

One purpose of the invention is therefore to propose an equipment support, such as an accessory gearbox or a gearbox of the PGB type which can be used in a turbine engine which can be modulated and makes it possible to allow flexibility in installing different accessories by not having to consider their size, without however modifying their drive speed, which also has moderate weight and which makes it possible to distribute the accessories over a greater perimeter of the turbine engine.

To that end, the invention proposes an equipment support for an engine comprising an engine shaft, said equipment support comprising:
at least one accessory comprising an output shaft,
an input gear wheel, said input gear wheel being driven in rotation on the one hand by the engine shaft of the engine at a main speed, and on the other hand connected to the output shaft of the accessory so as to drive it in rotation at a determined output speed,
an input shaft driven in rotation by the input gear wheel at a determined input speed, and
a geared reducer with magnetic gearing interposed between the input shaft and the output shaft, so that the input speed is different from the output speed.

Certain preferred but non-limiting features of the equipment support described above are the following:
the input gear wheel comprises a spiral bevel gear,
the equipment support also comprises a second accessory comprising an output shaft driven in rotation by an input gear wheel at a speed equal to the input speed,
the equipment support also comprises an equipment support housing, the reducer with magnetic gearing comprising an internal rotor, attached to the input shaft, an external rotor attached to the output shaft and a stator, attached with respect to the housing of the equipment support and accommodated between the internal rotor and the external rotor, the internal rotor, the external rotor and the stator being coaxial with the input shaft and the output shaft,
the reducer with magnetic gearing also comprising a cooling system,
the equipment support also comprises a reducer housing, fixed with respect to the equipment support housing and wherein the reducer housing comprises an internal cylindrical housing and an external cylindrical housing coaxial with the input shaft and the output shaft, said internal housing extending inside the external housing and the cooling system comprising a cooling space designed to receive a coolant, said cooling space being provided between the internal housing and the external housing,
the accessory is housed in an accessory housing fixed with respect to the equipment support, one of the internal housing and the external housing being fixed to the equipment support housing by means of an internal flange while the other of the external housing and the internal housing is attached to an accessory housing by means of an external flange, the equipment support also comprises substantially annular dynamic seals positioned between the internal rotor and reducer housing on the one hand and between the external rotor and the reducer housing on the other hand, the equipment support also comprises a static gasket with a substantially annular shape on either side of the cooling space between the internal housing and the external housing, configured to ensure a fluid-tight seal for said cooling space, the cooling space comprises at least one annular recess, substantially coaxial with the internal housing and the external housing, and a series of annular grooves formed in the internal housing and extending radially from the annular recess, the equipment support comprises an accessory gearbox for a turbofan or a turboprop or a gearbox for a turboprop.

According to a second aspect, the invention also proposes a turbine engine comprising an equipment support as described above.

According to a third aspect, the invention also comprises an aircraft comprising such an engine.

BRIEF DESCRIPTION OF THE DRAWINGS

Other features, aims and advantages of the present invention will appear more clearly upon reading the detailed description that follows, and with regard to the appended drawings given by way of non-limiting examples and wherein.

DETAILED DESCRIPTION OF AN EMBODIMENT

Figure 1:
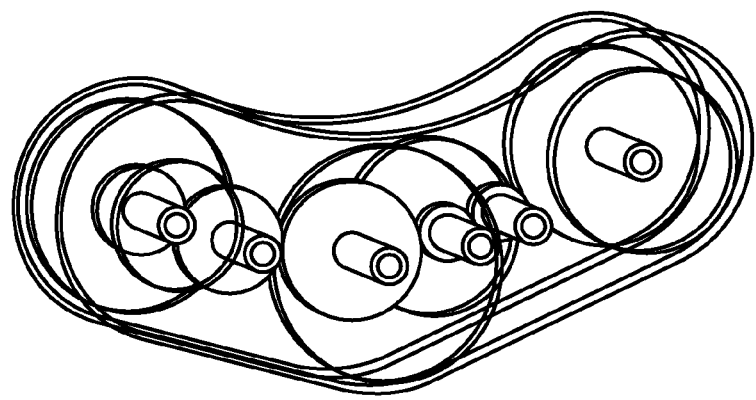
FIG. 1 is a perspective view of an example of an equipment support of the accessory gearbox type with parallel shafts conforming to the prior art, on which the accessories have been omitted.
Figure 2:
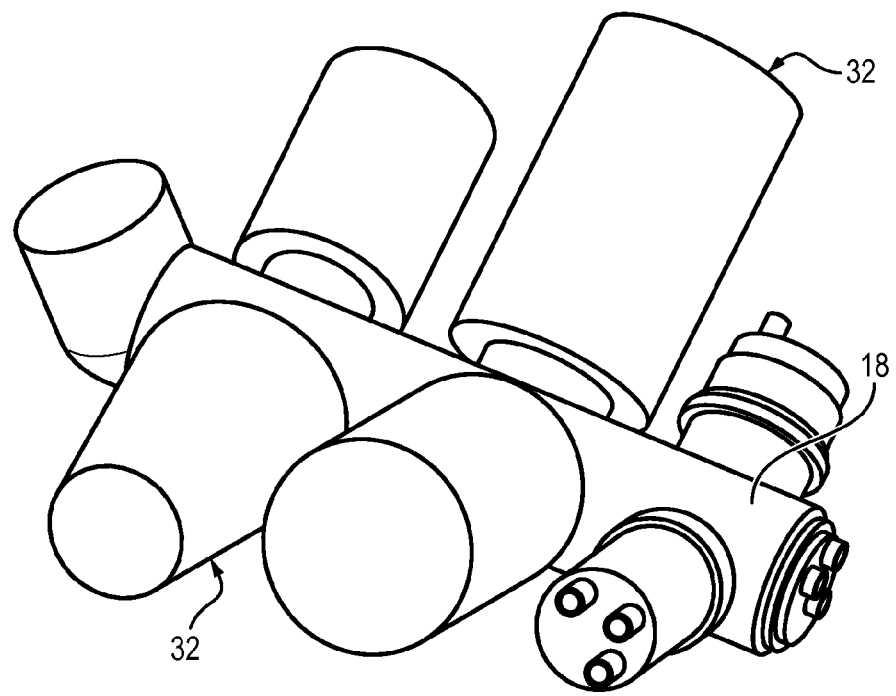
FIG. 2 is a schematic view in perspective of an example of an equipment support of the accessory gearbox type with non-parallel axes conforming to the prior art.
Figure 3:
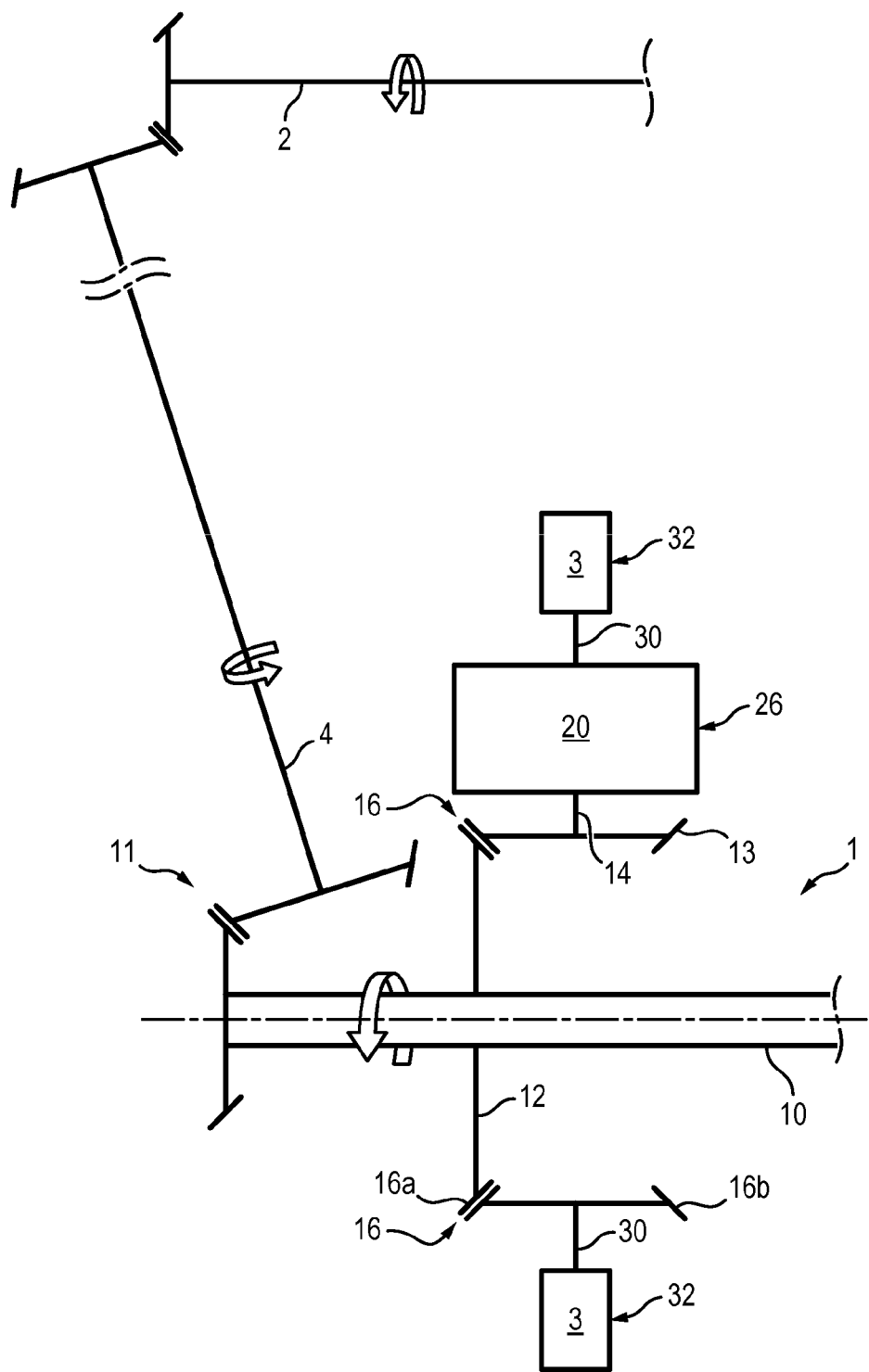
FIG. 3 is a partial schematic view of an example of architecture of an equipment support conforming to the invention.

The invention will be very particularly described with reference to an aircraft comprising a turbofan and an accessory gearbox 1 designed to mechanically drive auxiliary equipment, or accessories 3, necessary for the operation of the engine or to that of the aircraft. This is however not limiting, to the extent that the invention also applies to any other type of equipment support, such as a gearbox of the PGB type in particular, that the accessory gearbox 1 is usable in any other turbine engine needing to support and drive accessories 3, and that the number of accessories 3 described in what follows can be different depending on the requirements of the turbine engine.

A turbojet engine also typically comprises a nacelle which forms an opening for admitting a determined air flow into the engine itself. Generally, the turbofan comprises one or more sections for compressing air admitted into the engine. The air thus compressed is admitted into a combustion chamber and mixed with fuel before being burned there. The hot exhaust gases resulting from this combustion are then expanded in different stages of the turbine. The turbine then supplies the rotation power to the fan.

The accessory drive gearbox 1, or AGB 1, can be attached to a housing of the engine, for example below the fan or in the central compartment, and mechanically drives a series of accessories 3 by tapping the necessary drive power from an engine shaft 2, generally the compressor shaft.

To this end, the engine shaft 2 is accommodated in the engine casing and defines an axis of rotation. Moreover, the accessories 3 each comprise an output shaft 30 designed to mechanically drive the corresponding accessory 3.

L'AGB 1, for its part, is connected to the engine shaft 2 through a radial transmission shaft 4, which for its part is driven by the engine shaft 2.

The AGB 1 also comprises an input gear wheel 12 which is driven in rotation by the engine shaft 2 at a main speed and which is connected to the output shaft 30 of the accessory 3 so as to drive it in rotation at a determined output speed. The output speed is in particular determined by the type of accessory 3 to which the output shaft 30 is connected. The determination of output speeds based on the accessories 3 being conventional, it will not be further described here.

L'AGB 1 also comprises an input shaft 14, driven in rotation by the input gear wheel 12 at a determined input speed, and a reducer with magnetic gearing 20, interposed between the input shaft 14 and the output shaft 30, so that the input speed is different from the output speed.

The reducer with magnetic gearing 20, or reducer with magnetic gears 20, thus makes it possible to modify the drive speed of the output shaft 30 in a simple, inexpensive and reliable manner for a reduced axial size (along the output axis of the accessory 3) and a limited weight.

Hereafter, the invention will be more particularly describe in the case of an AGB 1 of the type with non-parallel gearing. This is not limiting, however, the invention also being applicable without substantial modification to an AGB 1 comprising gearing with parallel axes (as illustrated in FIG. 1) to the extent that it is sufficient to interpose a reducer with magnetic gears 20 between the output shaft 30 of the accessory 3 and the input gear wheel 12 of the AGB 1.

An AGB 1 with gearing having non-parallel axes comprises:

a primary shaft 10, driven by means of a primary angle drive 11 by the radial transmission shaft 4, a series of assemblies for mechanically driving output shafts 30 of the accessories 3, each comprising an angle drive 16 thus allowing the accessories 3 to be distributed over a greater angular sector of the perimeter of the turbofan 8, taking into account its dimensions and its geometry. Each angle drive 16 can comprise an input gear wheel 16a, driven by the primary shaft 10 of the AGB 1, and an output gear 16b, meshed with the input gear wheel and designed to drive the output shaft 30 to which it is connected. The input gear wheel 16a and the output gear 16b can have concurrent axes (of the bevel gear type) or non-concurrent axes (of the endless screw type).

It is possible to refer to the previously cited document FR 1355241 for more information on this type of AGB 1.

The primary shaft 10 and the mechanical accessory 3 drive assemblies are accommodated in a housing 18 of the AGB.

Here, the input gear wheel 12 is therefore attached to the primary shaft 10 of the AGB 1 and driven in rotation by the engine shaft 2 by means of the primary angle drive 11 and the radial transmission shaft 4. The speed of rotation of the input gear wheel 12 is therefore imposed by the speed of rotation of the engine shaft 2, the reduction ratio between the engine shaft 2 and the radial transmission shaft 4 and the reduction ratio between the radial transmission shaft 4 and the primary shaft 10 of the AGB 1.

The input gear wheel 12 drives in rotation an associated input gear wheel 13, integral with the input shaft 14 so as to drive it in rotation. In order to allow meshing of the input gear wheel 13 and the input gear wheel 12, the input gear wheel 13 is selected so as to have teeth of the same type and of the same module as the input wheel 12. For example, the input gear wheel 12 can be of the spiral bevel type. The input gear wheel 13 is then also of the spiral bevel type and with the same module. The reduction ratio between the input gear wheel 13 and the input gear wheel 12 determines the speed of rotation of the input shaft 14.

Preferably, the input gear wheel 12 can drive a second gear 16b, with the same module and of the same type as the input gear wheel 12. The second gear 16b is then attached to the output gear 30 of an accessory 3 so as to drive it in rotation. Conventionally, the speed of rotation of the second gear 16b depends on the gear ratio between the second gear 16b and the input gear wheel 12: here, the speed is substantially equal to the speed of rotation of the input shaft 14.

The reducer with magnetic gears 20 comprises:

an internal rotor 22, attached to the input shaft 14, for example using a castle connector, and comprising a first number of magnetic poles, an external rotor 23, attached to the output shaft 30 and comprising a second number of magnetic poles, and a stator 26, fixed with respect to the housing 18 of the AGB 1, said stator 26 being accommodated between the internal rotor 22 and the external rotor 23 and comprising a third number of magnetic poles.

Figure 4A:
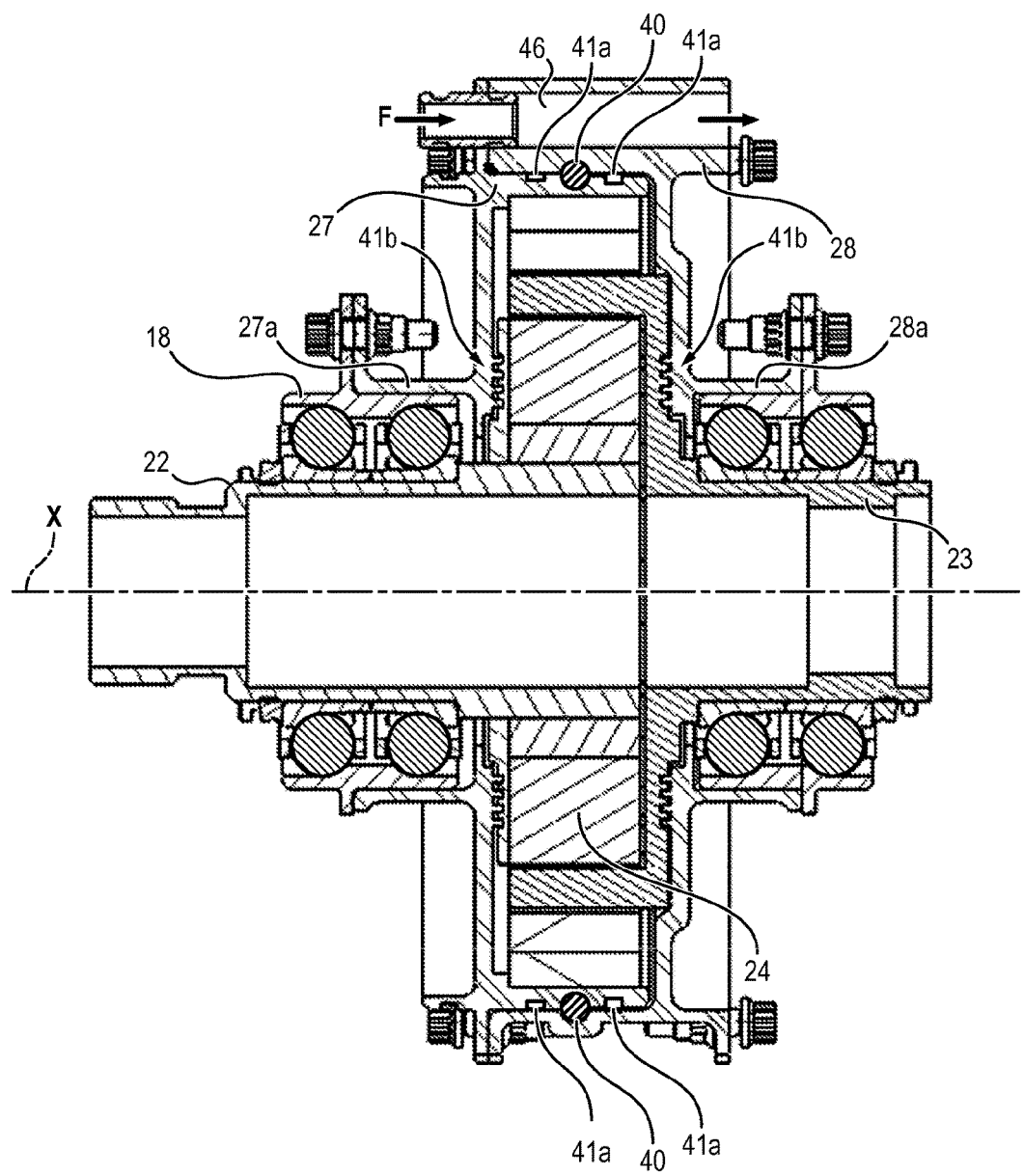
FIG. 4a is an axial section view of an embodiment of a reducer with magnetic gearing.
Figure 4B:
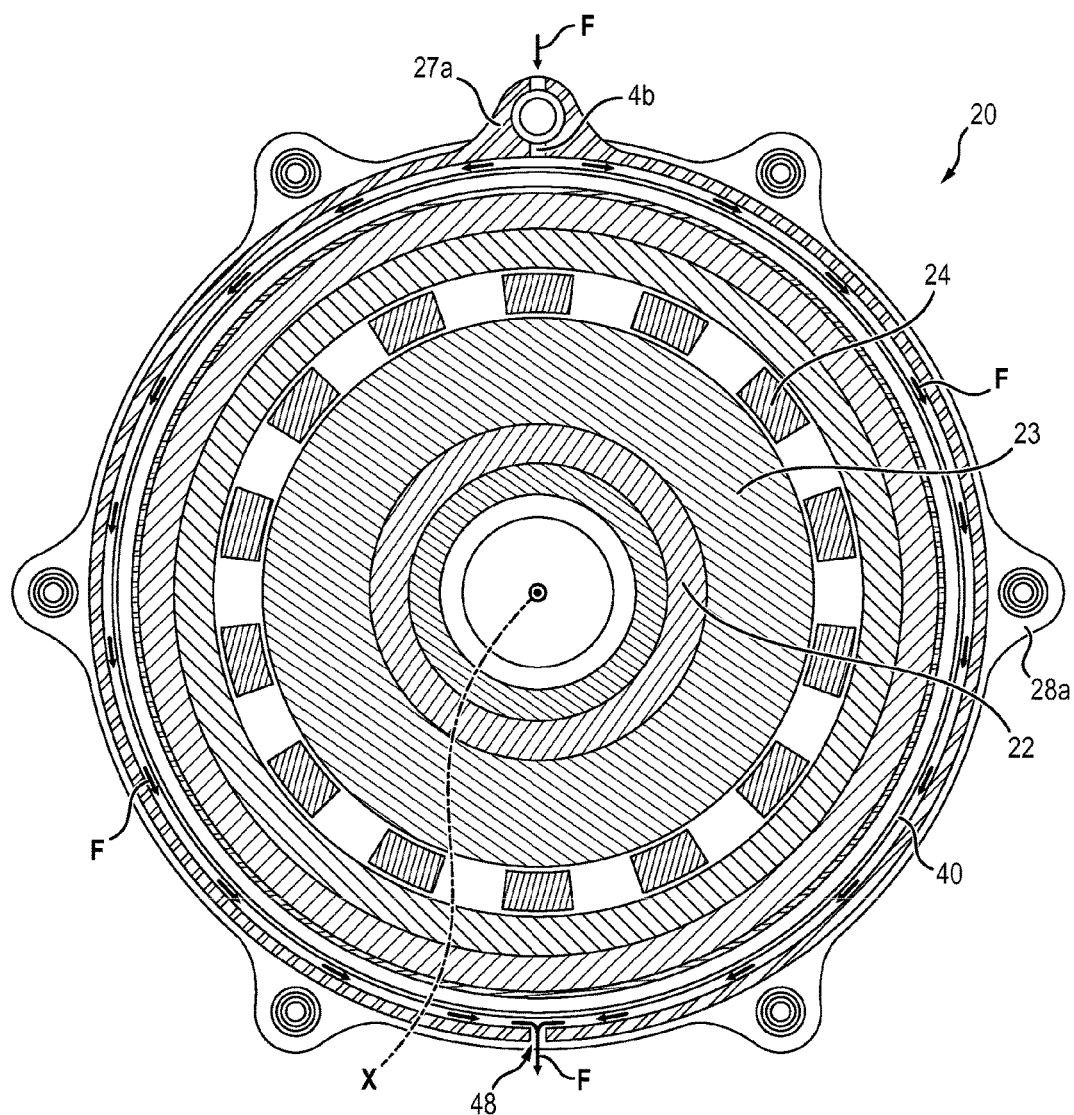
FIG. 4b is a front view of the reducer with magnetic gearing of FIG. 4a, and FIG. 5 is a partial section view of a reducer housing with magnetic gearing on which the cooling space can be seen.
Figure 5:
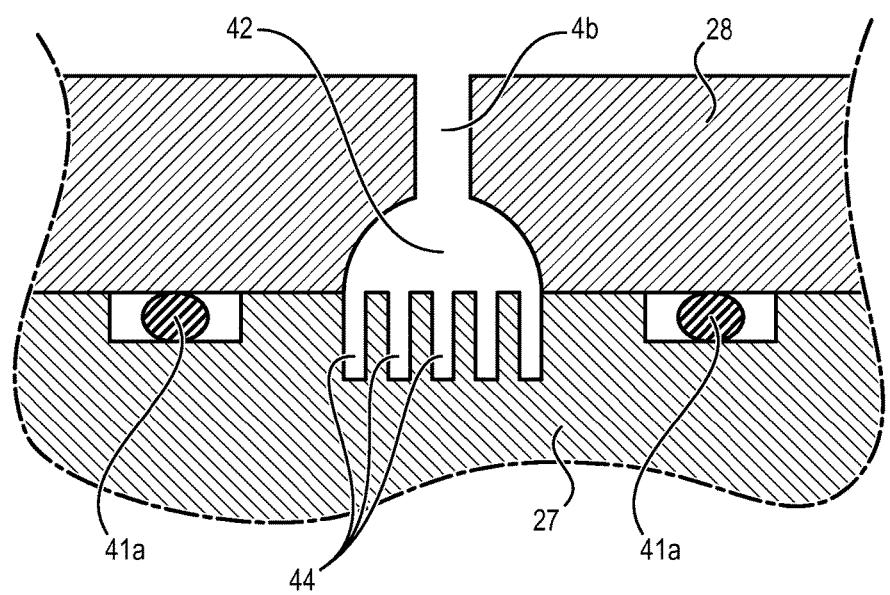

The internal rotor 22 and the external rotor 23 are coaxial with the input shaft 14 and the output shaft 30, and thus define an axis X, visible in FIGS. 4a and 4b. In a manner known per se, the number of magnetic poles of the internal rotor 22 and of the external rotor 23 determines the reduction ratio of the reducer with magnetic gears 20. Moreover, the type of magnetic poles (constituent material) and the geometry of the magnetic poles make it possible to adjust the coupling between the internal rotor 22 and the external rotor 23, and hence the coupling between the input shaft 14 and the output shaft 30.

In one embodiment, the internal rotor 22 comprises fewer magnetic poles than the external rotor 23 so as to obtain a reduction ratio greater than 1. Moreover the magnetic poles of the internal rotor 22 and of the stator 26 can comprise samarium-cobalt magnets while the magnetic poles of the external rotor 23 can comprise ferro-magnetic bars.

It will be noted that the implementation of a reducer with magnetic gears 20 makes it possible, if required, to avoid the addition of fusible means in the case where the rotation speed is too high for the accessory 3. In fact, the selection of different magnetic poles makes it possible to define a maximum coupling speed at which the output shaft 30 disengages. In fact, when the coupling between the input shaft 14 and the output shaft 30 becomes too great, the electromagnetic interaction between the magnetic poles of the internal rotor 22 and the magnetic poles of the external rotor 23 is no longer sufficient to drive the output shaft 30 in rotation: decoupling then occurs, which plays the role of a fuse allowing the input shaft 14 to be mechanically isolated from the output shaft 30.

The implementation of a reducer with magnetic gears 20 also makes it possible to provide for torque transmission without contact, and therefore without wear of the different meshing members 22, 23.

The reducer with magnetic gears 20 is accommodated in a housing 26, configured to isolate the reducer with magnetic gears 20 from its environment. In particular, the housing 26 makes it possible to avoid introducing oil from the meshing members of the AGB 1 (so as to lubricate the different members) which would be capable of damaging the reducer with magnetic gears 20 and to degrade its performance by introducing shear due to the presence of fluid between the rotors 22, 23. It will be noted in fact that, during operation, the housing 18 of the AGB contains relatively continuously a fog of oil resulting from the movement of the different meshing members which compose it.

The accessories 3 can also be accommodated in the accessory housings 32.

The housing 28 of the reducer with magnetic gears 20 and the accessory housings 32 are fixed with respect to the AGB housing 18.

The reducer with magnetic gears 20 being capable of increasing in temperature during the different phases of flight of the engine, it can include a cooling system. The cooling system must, however, be capable of effectively cooling the active parts of the reducer with magnetic gears 20, to with the internal rotor 22, the external rotor 23 and the stator 24, without however submerging them in the coolant F.

The housing 26 of the reducer with magnetic gears 20 can for example include a cylindrical internal housing 27 and a cylindrical external housing 28 coaxial with the input shaft 14 and the output shaft 30, the internal housing 27 extending inside the external housing 28. A clearance can then be provided between the internal housing 27 and the external housing 28 so as to define a confined cooling space 40 wherein a coolant F can circulate. As a variant, the cooling space 40 can be formed by machining opposing faces of the internal housing 27 and of the external housing 28.

In the embodiment illustrated in the figures, the internal housing 27 is attached to the AGB housing 1 by means of an internal flange 27a, while the external housing 28 is attached to the accessory 3 housing by means of an external flange 28a. As a variant, the internal housing 27 could be fixed to the accessory housing 30 by means of the external flange 28a, while the internal housing 27 is attached to the AGB 1 housing by means of the internal flange 27a. The internal housing 27 and the external housing 28 are therefore fixed with respect to the AGB 1 housing and to the accessory 3 housing.

The cooling space 40 can in particular have the form of an annular recess 42 machined into the opposite walls of the internal housing 27 and the external housing 28, the section whereof can be defined depending on the coolant F selected and the convective heat exchange necessary for sufficiently cooling the reducer with magnetic gears 20. The reducer with magnetic gears 20 can then comprise, on either side of the cooling space 40 (in the axial direction of the reducer with magnetic gears 20), a static gasket 41a of the O ring type making it possible to ensure the fluid-tightness of the cooling space 40 and avid the passage of coolant F toward the internal rotor 22, the external rotor 23 or the stator 24.

Optionally also, the reducer with magnetic gears 20 can comprise, in addition to or in place of static gaskets 41a, dynamic seals 41b of the labyrinth seal type, positioned between the reducer housing 26 and the internal rotor 22 on the one hand, and the external rotor 23 on the other hand. In the example illustrated in the figures, a first labyrinth seal 41b is formed between a radial wall of the internal housing 27 and the internal rotor 22, at the internal flange 27a, and a second labyrinth seal 41b is formed between a radial wall of the external housing 28 and the external rotor 23 at the external flange 28a. As a variant, the dynamic seals 41b can include air seals (injection of air into the middle of the labyrinths for sealing the space).

For example, the cooling space 40 can have an annular shape coaxial with the output shaft 30 and the input shaft 14 with a substantially circular or parallelepiped section, and comprise a series of annular grooves 44 formed in the internal housing 27 and extending radially from the annular recess 42. The grooves 44 thus make it possible to maximize convective heat exchange with the inner housing 27, for a reduced radial and axial size.

The cooling space 40 can in particular be supplied with coolant F from a separate reservoir. The cooling space 40 can furthermore be in fluid communication with the inner area of the AGB 1 housing: the coolant F then comprises the oil designed to circulate in the housing 18 of the AGB 1 in the form of a fog so as to lubricate the meshing members. For example, a duct 46 can be formed between the lubrication oil source and the casing 26 of the reducer with magnetic gears 20 so as to bring the oil into the cooling space 40. The oil then circulates in the annular cooling space 40, where it cools by forced convection the reducer with magnetic gears 20, then leaves the cooling space 40 at a higher temperature by an outlet 48 and enters, using a dedicated duct 48, the AGB 1 housing.

Thus, in the example illustrated in FIG. 4b, the coolant F enters into the annular cooling space 40 through the duct 46, passes through the housing of the AGB 1 and cools the reducer with magnetic gears 20, then leaves at the opposite end thereof through the duct 48. The coolant F can then be sent to the AGB housing 18.

The invention claimed is:

1. An equipment support for an engine comprising an engine shaft, said equipment support comprising an accessory gearbox for a turbofan or a turboprop or a gearbox for a turboprop and including:

at least one accessory comprising an output shaft, and
an input gear wheel, said input gear wheel being driven in rotation by the engine shaft of the engine on the one hand, at a main speed, and connected on the other hand to the output shaft of the accessory so as to drive it in rotation at a determined output speed,
the equipment support comprising an input shaft driven in rotation by the input gear wheel at a determined input speed, and a reducer with magnetic gears, interposed between the input shaft and the output shaft, so that the input speed is different from the output speed, and wherein the equipment support also comprises an equipment support housing, the reducer with magnetic gears comprising:
an internal rotor, attached to the input shaft,
an external rotor, attached to the output shaft and
a stator, fixed with respect to the equipment support housing and accommodated between the internal rotor and the external rotor, the internal rotor, and the external rotor and the stator being coaxial with the input shaft and the output shaft.

2. The equipment support according to claim 1, wherein the input gear wheel comprises a spiral bevel gear.

3. The equipment support according to claim 1, also comprising a second accessory comprising an output shaft driven in rotation by the input gear wheel at a speed equal to the input speed.

4. The equipment support according to claim 1, the reducer with magnetic gears also comprising a cooling system.

5. The equipment support according to claim 4, also comprising a reducer housing fixed with respect to the equipment support housing, wherein:

the reducer housing comprises a cylindrical internal housing and a cylindrical external housing coaxial with the input shaft and the output shaft, said internal housing extending inside the external housing, and
the cooling system comprising a cooling space designed to receive a coolant, said cooling space being provided between the internal housing and the external housing.

6. The equipment support according to claim 5, wherein the accessory is accommodated in an accessory housing fixed with respect to the equipment support housing, one of the internal housing and the external housing being attached to the equipment support housing by means of an internal flange, while the other of the external housing and the internal housing is attached to an accessory housing by means of an internal flange.

7. The equipment support according to claim 5, comprising substantially annular dynamic seals positioned between the internal rotor and the reducer housing on the one hand and between the external rotor and the reducer housing on the other hand.

8. The equipment support according to claim 5, also comprising a static gasket with a substantially angular shape on either side of the cooling space between the internal housing and the external housing, configured to ensure sealing of said cooling space.

9. The equipment support according to claim 5, wherein the cooling space comprises at least an annular recess, substantially coaxial with the internal housing and the external housing, and a series of annular grooves formed in the internal housing and extending radially from the annular recess.

* * * * *

UNITED STATES PATENT AND TRADEMARK OFFICE
CERTIFICATE OF CORRECTION

PATENT NO. : 10,352,250 B2
APPLICATION NO. : 15/518281
DATED : July 16, 2019
INVENTOR(S) : Maxence Guillemont et al.

Page 1 of 1

It is certified that error appears in the above-identified patent and that said Letters Patent is hereby corrected as shown below:

On the Title Page

(72) Inventors, change "Agenteuil (FR)" to --Argenteuil (FR)--.

Signed and Sealed this
Seventh Day of January, 2020

Andrei Iancu
*Director of the United States Patent and Trademark Office*